Patented Aug. 5, 1952

2,606,168

UNITED STATES PATENT OFFICE 2,606,168

SOLUTIONS OF ACRYLONITRILE POLYMERS IN TETRAKIS (N,N - DIMETHYLAMIDO) PYROPHOSPHATE

George E. Ham, Dayton, Ohio, assignor to Monsanto Chemical Company, St. Louis, Mo., a corporation of Delaware No Drawing. Application May 29, 1950, Serial No. 165,115

10 Claims. (Cl. 260—30.6)

1

This invention relates to a new method of preparing synthetic fibers from polymers of acrylonitrile. More particularly, the invention relates to solutions of acrylonitrile polymers and pyrophosphoric acid having its four available acidic groups reacted with dimethylamine, from which mixtures it is possible to prepare high tenacity fibers by efficient industrially practicable extrusion procedures.

It is well known that polyacrylonitrile and some of the copolymers of acrylonitrile have excellent fiber-forming properties. The conventional technique of fiber preparation involves the dissolution of the polymer in a suitable solvent, and thereafter extruding the solution into a medium which removes the solvent from the solution and precipitates the polymer in a continuous form. Many solvents are known to be capable of dissolving acrylonitrile polymers, among them N,N-dimethylformamide has been used and is widely regarded as the most desirable of such solvents. The use of N,N-dimethylformamide is under some circumstances objectionable by reason of the fact that it may become hydrolyzed. Other solvents are known but many of these are inferior with respect to solvent properties, or are too costly to provide economical fiber spinning methods, or are too volatile or unstable at the optimum fiber spinning temperatures.

The primary purpose of this invention is to provide a new solvent which is unusually effective in dissolving acrylonitrile polymers. A further purpose is the preparation of more stable solutions of acrylonitrile polymers, that can be readily extruded in high concentrations and/or at elevated temperatures. Another purpose of this invention is to provide an improved method of preparing high tenacity fibers of acrylonitrile polymers.

It has been found that tetrakis(N,N-dimethylamido)-pyrophosphate, a compound having the structural formula:

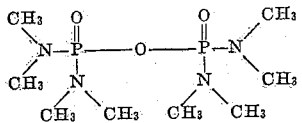

is an unusually effective solvent for the dissolution of acrylonitrile polymers. It is outstanding as a solvent because of its lower vapor pressure which facilitates recovery and enables spinning at higher temperatures where larger proportions of solid can exist in spinnable solutions.

The polymers which are useful in the prac-

2 tice of this invention are polyacrylonitrile, copolymers of acrylonitrile with minor proportions of other monoölefinic compounds polymerizable therewith, and mixtures of acrylonitrile polymers with other polymeric compositions, including olefinic polymers, or other types of polymeric substances. These mixtures, or blended polymeric compositions, are especially useful for the purpose of developing dye-receptive polymers, for example by blending non-dyeable acrylonitrile polymers with a minor proportion of a polymer chemically reactive with dyestuff. In general, there is a minimum proportion of acrylonitrile which should be present in polymeric form in order to have adequate tensile properties in the fibers prepared therefrom. Thus, a polymer of a monomeric mixture of which acrylonitrile is at least 70 per cent of the polymerizable content, is useful in the practice of this invention.

Useful copolymers, other than polyacrylonitrile, are the copolymers of 80 or more per cent of acrylonitrile and one or more of other monoölefinic monomers. Suitable other monomers include, vinyl acetate and other vinyl esters of monocarboxylic acids, vinylidene chloride, vinyl chloride and other vinyl halides, dimethyl fumarate and other dialkyl esters of fumaric acid, dimethyl maleate and other dialkyl esters of maleic acid, methyl acrylate and other alkyl esters of acrylic acid, styrene and other vinyl substituted aromatic hydrocarbons, methyl methacrylate and other alkyl esters of methacrylic acid, methacrylonitrile, α-vinylpyridine and other vinyl substituted heterocyclic-nitrogen ring compounds, the alkyl substituted vinylpyridines, vinyl chloroacetate, allyl chloroacetate, methallyl chloroacetate, allyl glycidyl ether, methallyl glycidyl ether, allyl glycidyl phthalate and the corresponding esters of other aliphatic and aromatic dicarboxylic acids, glycidyl acrylate, glycidyl methacrylate, and other monoölefinic monomers copolymerizable with acrylonitrile. Of particular utility are the comonomers which contain one polymerizable olefinic radical whereby the copolymerization with acrylonitrile may be effected and one acidic, basic or otherwise reactive group capable of bonding the dyestuff with which the ultimate fiber may be treated.

Many of the more readily available comonomers for polymerization with acrylonitrile, form copolymers which are not reactive with the dyestuffs and may therefore be impossible or difficult to dye with conventional techniques. Accordingly, these non-dyeable fiber-forming copolymers may be blended with polymers or copolymers which are in themselves more dye-receptive by reason of their physical structure or by reason of the presence of functional groups which are chemically reactive with the dyestuff, whereby the dyestuff is permanently bonded to the polymer in a manner which lends resistance to the usual laundering and dry-cleaning procedures. Suitable blending polymers may be polyvinylpyridine, polymers of alkyl substituted vinylpyridine, polymers of other vinyl substituted N-heterocyclic compounds, the copolymers of the various vinyl substituted N-heterocyclic compounds and other copolymerizable monomers, particularly acrylonitrile.

Of particular utility are the blends of non-dyeable acrylonitrile polymers of good fiber-forming properties, for example, polyacrylonitrile or a copolymer of more than 95 per cent acrylonitrile and up to five per cent of vinyl acetate, and a copolymer of vinylpyridine or an alkyl substituted vinylpyridine and acrylonitrile, the said acrylonitrile being present in substantial proportions, for example 50 to 80 per cent to provide heat and solvent resistance, and a substantial proportion of the pyridine or derivative thereof to render the blend receptive to acid dyestuffs. Of particular utility are the blends of copolymers of 97 per cent acrylonitrile and three per cent vinyl acetate and sufficient copolymer of 50 per cent acrylonitrile and 50 per cent vinylpyridine to produce a blended composition with a total of five to eight per cent by weight of vinylpyridine.

Other compositions suitable for blending with non-dyeable acrylonitrile polymers are: the polyamides prepared by condensing an alkylene diamine having up to six carbon atoms and a compound of the group consisting of crotonic acid, acrylic acid, methacrylic acid and the alkyl esters of these acids, wherein the alkyl radical has up to five carbon atoms; the polyamides prepared by condensing N-alkylazadinitriles with formaldehyde; the polyesters prepared by reacting dicarboxylic acids with glycols containing tertiary amino groups; and other polymers containing tertiary amino radicals capable of reacting chemically with the acid dyestuffs.

A further class of useful dye-receptive resins suitable for blending with the nondye-receptive acrylonitrile polymers are the tertiary amino group containing polymers and copolymers described in the preceding paragraphs which have been reacted with aliphatic halides, for example butyl bromide, chloracetic acid, methyl chloroacetate, with the esters of oxygen containing sulfur acids which acids have ionization constants less than $10^{-4}$, for example, methyl sulfate and methyl p-toluenesulfonate and with the various acids, such as sulfuric acid, hydrochloric acid and benzenesulfonic acid. By these reactions blending resins containing amino groups are converted to quaternary or tertiary ammonium salts, which are more dye-receptive than are the corresponding amino group containing resins.

Such polymers may be fabricated into fibers or films of unusual properties, for example, high tensile strength, unusual thermal and chemical stability, and exceptional resistance to solvents. The optimum combination of physical and chemical properties are found in the polymers and copolymers of larger proportions of acrylonitrile, for example in excess of 85 per cent. It will be found that the practice of this invention with respect to the latter class of substances is most beneficial.

In the practice of this invention, as in the preparation of acrylonitrile fibers by prior art methods, the physical properties of the polymers are of substantial importance. It is desirable that the polymers be uniform with respect to molecular weight, particle size, and chemical composition. Accordingly, the methods for their preparation must be selected so as to induce the uniformity of chemical and physical properties. In general, the molecular weight should be in excess of 10,000 and preferably in excess of 25,000, the molecular weights being determined by measuring the viscosity of dilute solutions in the manner well known in the art.

It has been found that polymers and copolymers of desirable physical properties are those which are prepared by the aqueous suspension technique, wherein the monomers or mixture of monomers are added to an aqueous medium maintained under conditions suitable for a rapid but controlled polymerization. The aqueous medium should contain a water-soluble peroxy catalyst and a dispersing agent which induces the precipitation of a finely divided polymer during the reaction. In order to insure the optimum concentration of peroxy catalyst and dispersing agent it is frequently desirable to add the catalyst and dispersing agent continuously or intermittently throughout the course of the reaction. The preferred practice involves the charging of the monomers or mixtures of monomers, gradually during the course of the reaction at a uniform rate or at a varying rate which permits the maintenance of the reaction at a constant temperature, for example the reflux temperature.

The fiber-forming acrylonitrile polymers are prepared by polymerization in the presence of water-soluble peroxide catalysts, such as the alkali metal salts of the various peroxy acids, for example sodium perborate, sodium percarbonate, and potassium persulfate. Stabilizing or dispersing agents, such as the water-soluble salts of the sulfonated mahogany acids, salts of the formaldehyde condensed naphthaline sulfonic acids, salts of sulfonated alkylbenzenes, salts of triethanolamine, sodium stearate and other salts of carboxylic acids, and mixtures thereof prepared by the saponification of animal and vegetable oils.

Desirable methods for the preparation of desirable acrylonitrile polymers of uniform molecular weight involve the use of regulators, for example, tertiary dodecyl mercaptan, $\beta$-mercaptoethanol, thioglycolic acid, $\beta$-mercaptopropionic acid, and acetaldehyde. The nature of the other monomeric substances being polymerized with the acrylonitrile may determine the type of substance useful as a regulator. For example, in the copolymerization of acrylonitrile with monomers, such as vinyl acetate, methyl methacrylate, and styrene, thioglycolic acid is unusually beneficial. However, in the preparation of copolymers of the basic monomers, such as vinylpyridine, the use of tertiary aliphatic mercaptans will be found to be very effective.

In the practice of this invention the polymers of acrylonitrile are used in finely divided form. Although massive polymers may be ground to desirable size the selection of a suspension polymerization procedure in accordance with the above principles will produce the desired subdivided state directly without resort to separate comminution procedures. The polymer solutions are prepared by dispersing the finely divided polymers in the solvent and heating with stirring, tumbling or other agitation until a free-flowing uniform homogeneous solution is obtained.

It is desirable to use a solution of as high a concentration as possible, but the maximum concentration is dependent upon the molecular weight of the polymer and the viscosity characteristics of the polymer-solvent mixture. To obtain fibers of optimum physical properties polymers of molecular weights in excess of 25,000 are used, and with such polymers it is only possible to dissolve a relatively small proportion in the tetrakis(dimethylamido)pyrophosphate without exceeding practical viscosity values. Although as little as five percent of polymer can be used in the spinning solution, such low concentrations are undesirable because they necessitate the removal of too much solvent from the extruded solution, thereby increasing solvent recovery cost as well as reducing spinning speed and lengthening the period required for coagulation. The concentration of polymer in the spinning solution is usually between eight and 35 per cent, but concentrations up to the maximum are practicable. The concentration of the polymer will ultimately be determined by considering the desired physical properties of the fiber and the speed of spinning, the latter depending upon the concentration and viscosity of the spinning solution. The viscosity will depend upon the chemical composition and molecular weight of the polymer, and the optimum concentration can best be determined by selecting a uniform high molecular weight polymer having good fiber-forming properties, and dissolving a given amount in as little of the tetrakis(N,N-dimethylamido)pyrophosphate as possible to form a viscous solution capable of being spun at convenient temperatures.

The fibers are spun by extruding the polymer solution through an orifice or a spinneret having a plurality of orifices into a medium which removes the tetrakis(N,N-dimethylamido)pyrophosphate. The volume of solution passed through the spinneret in a given time must be constant in order to produce a fiber of a uniform size. This is best achieved by using a positively driven gear pump adapted to deliver a constant flow of solution regardless of minor changes in viscosity and the variable resistance offered by the spinneret. It is also desirable to pass the solution which has been prefiltered, through one or more additional filters before the spinneret to remove the last traces of foreign matter and particles of incompletely dissolved polymer. The polymers may be delivered to the gear pump by pressures applied by an inert gas to the solution reservoir, which is heated if necessary, to make the solution fluid enough to pass through the conduits. The extruding operation should be operated at elevated temperatures, but well below the boiling point of the solvent to facilitate the handling of the apparatus.

The medium into which the solution is extruded and which removes the solvent is preferably liquid. The method involving the use of liquids, known as "wet spinning," usually utilizes water, alcohol, salt solutions or any liquid which is a solvent for the tetrakis(N,N-dimethylamido)-pyrophosphate, but in which the copolymer is insoluble. The solvent is leached out of the stream of polymer solution which becomes a viscous stream and finally a solid filament. When a spinneret with several apertures is used the several streams of polymer converge to form a single strand. The spin bath must necessarily be of sufficient size to permit the complete, or substantially complete, removal of the solvent. Obviously, the rapidity of extrusion will also affect the size of the spin bath, high speeds requiring longer baths. The temperature of the bath also affects the size, higher temperatures permitting more rapid diffusion of the solvent out of the fiber and thereby permitting the use of shorter baths.

In general, the methods of wet spinning which are in commercial use are readily adaptable to spinning solutions of polymers in tetrakis(N,N-dimethylamido)pyrophosphate. Similarly, conventional automatic machinery for spinning continuously, drying the thread if necessary, and winding it upon suitable spools can be used. As in the case of most synthetic fibers the polymers of acrylonitrile, which are spun from tetrakis-(N,N-dimethylamido) pyrophosphate solution must be oriented by stretching to develop optimum physical properties. If desired, part of this stretching may be accomplished in the spin bath, by drawing the fiber out of the bath more rapidly than the rate of extrusion.

The practice of this invention involves other advantages over the prior art use of N,N-dimethylformamide, especially with respect to the ease of polymer solution preparation and the tendency of the polymer to remain in solution. N,N-dimethylformamide is known to form difficultly soluble gels when first dispersed in a solvent, and to minimize this effect the solvent and polymer are first cooled to about 0° C. and then mixed; the tetrakis(N,N-dimethylamido)pyrophosphate, however, can be dispersed at room temperature with little or no gel formation.

Further details of the practice of this invention are set forth with respect to the following example.

*Example*

One part by weight of a copolymer of 95 per cent acrylonitrile and five per cent of vinyl acetate was dispersed in seven parts of tetrakis(N,N-dimethylamido)pyrophosphate. The mixture was then heated to 160° C. at which temperature a homogeneous transparent solution was formed. Cooling to room temperature did not affect the solution. Fibers were formed by spinning in contact with water. Films were prepared by pouring the solution on a smooth surface and washing the surface with water.

The invention is defined by the following claims.

I claim:

1. A new composition of matter comprising a homogeneous miscible mixture of tetrakis(N,N-dimethylamido)pyrophosphate and a polymer of monomeric substances of which acrylonitrile is at least 70 per cent of the polymerizable content, said polymer having a molecular weight of at least 25,000.

2. The composition in accordance with claim 1, wherein the polymer is polyacrylonitrile.

3. The composition defined by claim 1, wherein the polymer is a copolymer of 95 per cent acrylonitrile and five per cent vinyl acetate.

4. The composition defined by claim 1, wherein the polymer is a copolymer of 90 to 98 per cent acrylonitrile and from two to ten per cent of a vinylpyridine.

5. The composition defined by claim 1, wherein the polymer is a copolymer of 90 to 99 per cent acrylonitrile and one to ten per cent of methallyl chloroacetate.

6. A new composition of matter, comprising a homogeneous miscible mixture of from five to 25 parts by weight of tetrakis(N,N-dimethylamido)-pyrophosphate and from 75 to 95 per cent of a polymer of monomeric substances of which acrylonitrile is at least 70 per cent of the polymerizable content, said polymer having a molecular weight of at least 25,000.

7. A new composition of matter comprising a homogeneous miscible mixture of from five to 25 parts by weight of tetrakis(N,N-dimethylamido)-pyrophosphate and from 75 to 95 per cent of a polymer of monomeric substances of which acrylonitrile is at least 70 per cent of the polymerizable content, said polymer having a molecular weight of at least 25,000.

8. A new composition of matter, comprising a homogeneous miscible mixture of from five to 25 parts by weight of tetrakis(N,N-dimethylamido)-pyrophosphate and from 75 to 95 per cent of a polymer of 95 per cent acrylonitrile and five per cent vinyl acetate, said polymer having a molecular weight of at least 25,000.

9. A new composition of matter, comprising a homogeneous miscible mixture of from five to 25 parts by weight of tetrakis(N,N-dimethylamido)-pyrophosphate and from 75 to 95 per cent of a polymer of a copolymer of 90 to 98 per cent of acrylonitrile and from two to ten per cent of a vinylpyridine, said polymer having a molecular weight of at least 25,000.

10. A new composition of matter, comprising a homogoneous miscible mixture of from five to 25 parts by weight of tetrakis(N,N-dimethylamido)-pyrophosphate and from 75 to 95 per cent of a copolymer of 90 to 99 per cent acrylonitrile and one to ten per cent of methallyl chloroacetate, said polymer having a molecular weight of at least 25,000.

GEORGE E. HAM.

REFERENCES CITED

The following references are of record in the file of this patent:

UNITED STATES PATENTS

| Number | Name | Date |
|---|---|---|
| 2,487,859 | Dickey et al. | Nov. 15, 1949 |

OTHER REFERENCES

"Reference Book of Inorganic Chemistry," by Latimer and Hildebrand, 1940, revised edition, pages 220 and 224.

Nature, vol. 163, pgs. 787–9 (1949).